United States Patent
Chiu

(10) Patent No.: US 8,844,925 B1
(45) Date of Patent: Sep. 30, 2014

(54) SHEET STORAGE DEVICE AND SHEET PROCESSING APPARATUS USING SUCH DEVICE

(71) Applicant: Avision Inc., Hsinchu (TW)

(72) Inventor: Chin-Chu Chiu, Hengshan Township, Hsinchu County (TW)

(73) Assignee: Avision Inc. (TW)

( * ) Notice: Subject to any disclaimer, the term of this patent is extended or adjusted under 35 U.S.C. 154(b) by 0 days.

(21) Appl. No.: 14/220,914

(22) Filed: Mar. 20, 2014

(30) Foreign Application Priority Data

May 17, 2013 (TW) .............................. 102117586 A

(51) Int. Cl.
*B65H 31/34* (2006.01)
*B65H 5/00* (2006.01)

(52) U.S. Cl.
CPC .......... *B65H 31/34* (2013.01); *B65H 2403/411* (2013.01); *B65H 5/00* (2013.01); *B65H 2511/12* (2013.01)
USPC ........................................ 271/171; 271/240

(58) Field of Classification Search
CPC ............... B65H 31/34; B65H 2511/12; B65H 2403/411
USPC ......................................... 271/171, 240, 223
See application file for complete search history.

(56) References Cited

U.S. PATENT DOCUMENTS

| | | | |
|---|---|---|---|
| 5,988,621 A * | 11/1999 | Kondo et al. | ................ 271/3.02 |
| 8,398,074 B2 * | 3/2013 | Uchino | ......................... 271/171 |
| 8,678,381 B2 * | 3/2014 | Kim et al. | ...................... 271/220 |
| 2003/0178761 A1 * | 9/2003 | Kuwata et al. | ............. 270/58.08 |
| 2010/0061790 A1 * | 3/2010 | Yu et al. | ........................ 400/613 |
| 2010/0150634 A1 * | 6/2010 | Yoshida | ........................ 399/405 |
| 2013/0001866 A1 * | 1/2013 | Hsu | ................................ 271/171 |
| 2013/0056925 A1 * | 3/2013 | Hsu | ................................ 271/171 |

* cited by examiner

*Primary Examiner* — Patrick Cicchino

(57) ABSTRACT

A sheet storage device includes a sheet tray, two guide plates and a width adjusting mechanism. The sheet tray supports a sheet. The two guide plates, disposed on the sheet tray, guides transportation of the sheet placed on the sheet tray. The width adjusting mechanism, disposed on the sheet tray and connected to the two guide plates, adjusts a distance between the two guide plates. The width adjusting mechanism includes a pinion, a resilient member, a toothed portion and two connectors. The pinion is rotatably disposed. The resilient member is disposed coaxially with and rotated with the pinion. The toothed portion is disposed around the resilient member and in contact with the resilient member. The toothed portion provides a resisting force upon rotation of the pinion. Each connector connects the pinion to one of the guide plates.

13 Claims, 7 Drawing Sheets

SHEET STORAGE DEVICE AND SHEET PROCESSING APPARATUS USING SUCH DEVICE

This application claims priority of No. 102117586 filed in Taiwan R.O.C. on May 17, 2013 under 35 USC 119, the entire content of which is hereby incorporated by reference.

BACKGROUND OF THE INVENTION

1. Field of the Invention

The present invention relates in general to a sheet storage device and a sheet processing apparatus using such device, and more particularly to a sheet storage device using a toothed portion and a resilient member pushing against each other to provide a resisting force to two guide plates, and a sheet processing apparatus using such device.

2. Related Art

Automatic document feeders are widely used in scanners, printers and multi-function peripherals. The sheets to be placed on the automatic document feeder are usually decided by the user. Thus, the automatic document feeder is usually equipped with a left guide plate and a right guide plate for clamping and guiding the sheet or sheets, so that the user can manually perform the adjustment according to the width of the sheet to avoid the skew upon transportation of the sheet.

The sheet width adjusting mechanism on a conventional automatic document feeder is usually achieved by a pinion and two racks, which are disposed on two sides of the pinion and mesh with the pinion. When the user moves the left guide plate, the pinion is rotated by the left guide plate and thus moves the right guide plate. As a result, the left guide plate and the right guide plate may be moved synchronously.

Although the user can smoothly and continuously adjust the distance between the two guide plates of the sheet width adjusting mechanism, the user tends to adjust the gap between the two guide plates to be too small when no resisting force is present, so that the two edges of the sheet are pressed. This condition further tends to occur when only one sheet, a few sheets or the very thin sheets are processed, and the user must carefully adjust the distance between the two guide plates back and forth in an inconvenient manner.

SUMMARY OF THE INVENTION

Accordingly, the present invention has been proposed to solve the problems of the prior art, and it is an object of the present invention to provide a sheet storage device, which provides a resisting force, and a sheet processing apparatus using such device, whereby the provided resisting force avoids the above-mentioned problems.

To achieve the above-identified object, the present invention provides a sheet storage device including a sheet tray, two guide plates and a width adjusting mechanism. The sheet tray supports a sheet. The two guide plates, disposed on the sheet tray, guide transportation of the sheet placed on the sheet tray. The width adjusting mechanism, disposed on the sheet tray and connected to the two guide plates, adjusts a distance between the two guide plates. The width adjusting mechanism includes a pinion, a resilient member, a toothed portion and two connectors. The pinion is rotatably disposed. The resilient member is disposed coaxially with and rotated with the pinion. The toothed portion is disposed around the resilient member and in contact with the resilient member. The toothed portion provides a resisting force upon rotation of the pinion. Each connector connects the pinion to one of the guide plates.

The present invention also provides a sheet storage device including a sheet tray, two guide plates and a width adjusting mechanism. The sheet tray supports a sheet. The two guide plates, disposed on the sheet tray, guide transportation of the sheet placed on the sheet tray. The width adjusting mechanism, disposed on the sheet tray, connects the two guide plates and adjusts a distance between the two guide plates. The width adjusting mechanism includes a pinion, a toothed member, a resilient flange and two connectors. The pinion is rotatably disposed. The toothed member is disposed coaxially with and rotated with the pinion. The resilient flange is disposed around the toothed member and in contact with the toothed member. The resilient flange provides a resisting force upon rotation of the pinion. Each connector connects the pinion to one of the guide plates.

The present invention further provides a sheet processing apparatus including the sheet storage device, a sheet-feeding mechanism and a sheet processing unit. The sheet-feeding mechanism transports the sheet past the sheet processing unit. The sheet processing unit processes the sheet.

According to the sheet storage device and the sheet processing apparatus of the present invention, the toothed portion and the resilient member pushing against each other are utilized to provide the resisting force for the two guide plates. The resisting force provides the discontinuous and reliable feeling to the user, thereby enhancing the width adjustment accuracy and efficiency, and reducing the trouble that may be encountered when the user is adjusting the distance between the guide plates. This provides another different operation feeling for the user.

Further scope of the applicability of the present invention will become apparent from the detailed description given hereinafter. However, it should be understood that the detailed description and specific examples, while indicating preferred embodiments of the present invention, are given by way of illustration only, since various changes and modifications within the spirit and scope of the present invention will become apparent to those skilled in the art from this detailed description.

DETAILED DESCRIPTION OF THE INVENTION

The present invention will be apparent from the following detailed description, which proceeds with reference to the accompanying drawings.

Figure 1:
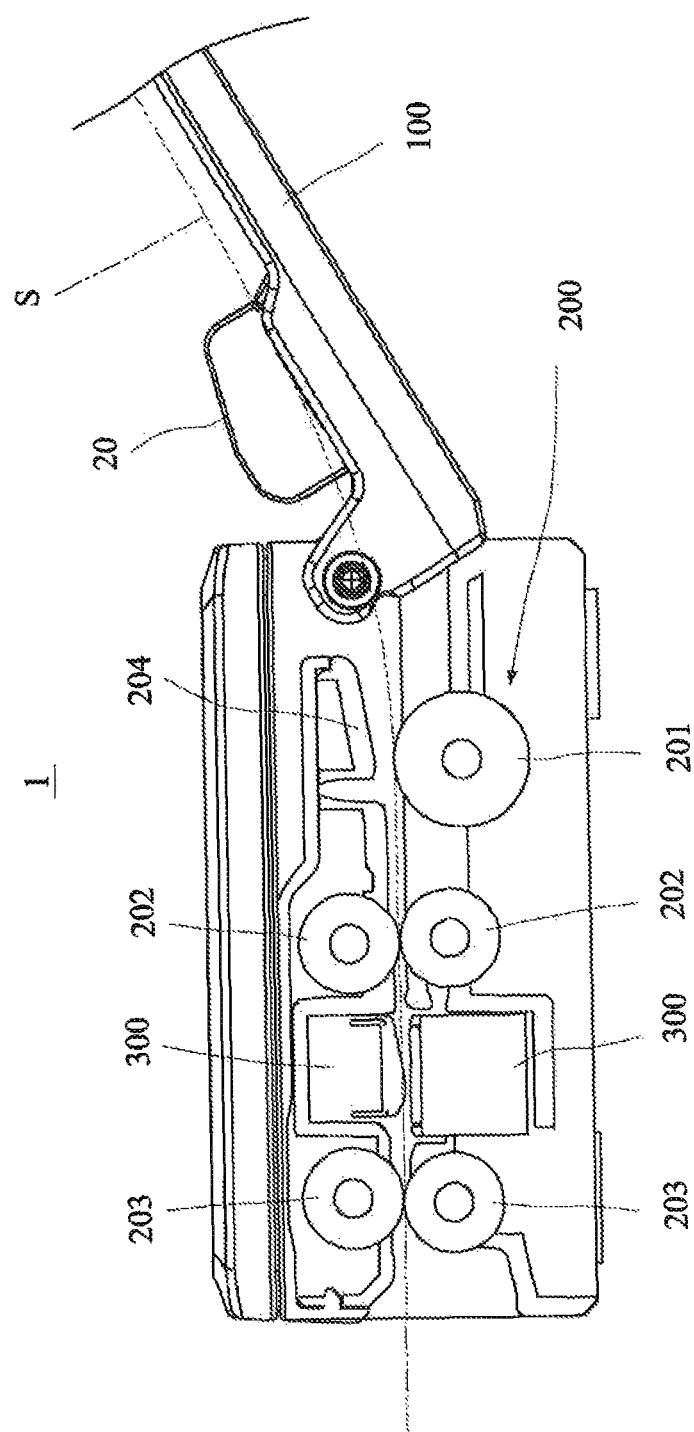
FIG. 1 is a side view of a sheet processing apparatus according to a first embodiment of the present invention.

FIG. 1 is a side view of a sheet processing apparatus 1 according to a first embodiment of the present invention. Referring to FIG. 1, the sheet processing apparatus 1 of this embodiment includes a sheet storage device 100, a sheet-feeding mechanism 200 and two sheet processing units 300.

The sheet-feeding mechanism 200 includes rollers 201, 202 and 203 and a separation pad 204. The roller 201 works with the separation pad 204 to perform sheet separation. In FIG. 1, the separation pad 204 can press the separation roller 201 by the mechanism design or the resilient force of the spring. The paired rollers 202 and the paired rollers 203 transport the sheet S across the sheet processing units 300, which process the sheet S. In this embodiment, two scanning modules for acquiring images of a front side and a reverse side of the sheet S are described as the example of the sheet processing unit 300. However, the present invention is not restricted thereto. It is also possible to use a single scanning module to perform a simplex image acquiring process on the sheet S, or to use one or multiple print modules to print data on the sheet S.

Figure 2:
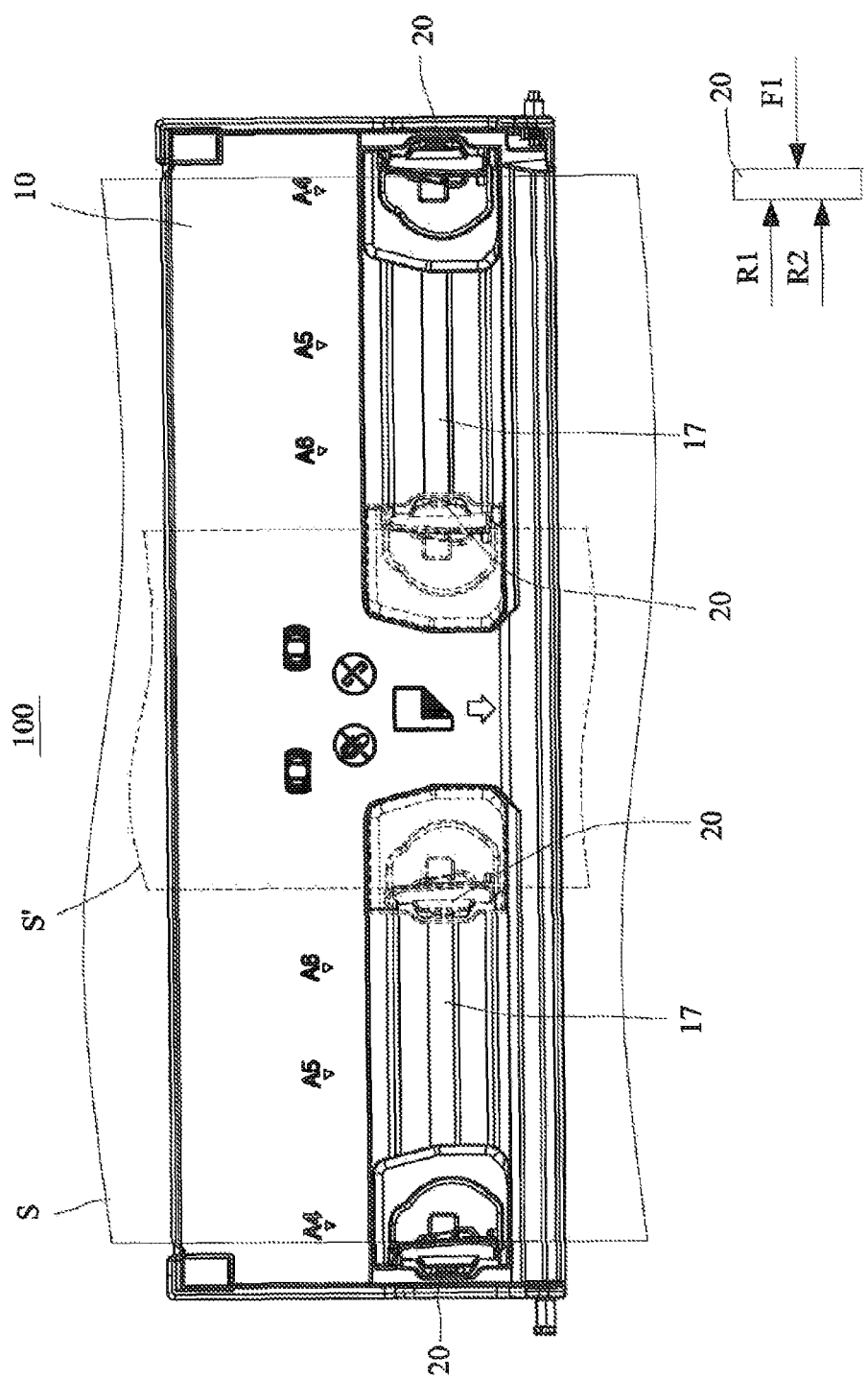
FIG. 2 is a front view of a sheet storage device.
Figure 3:
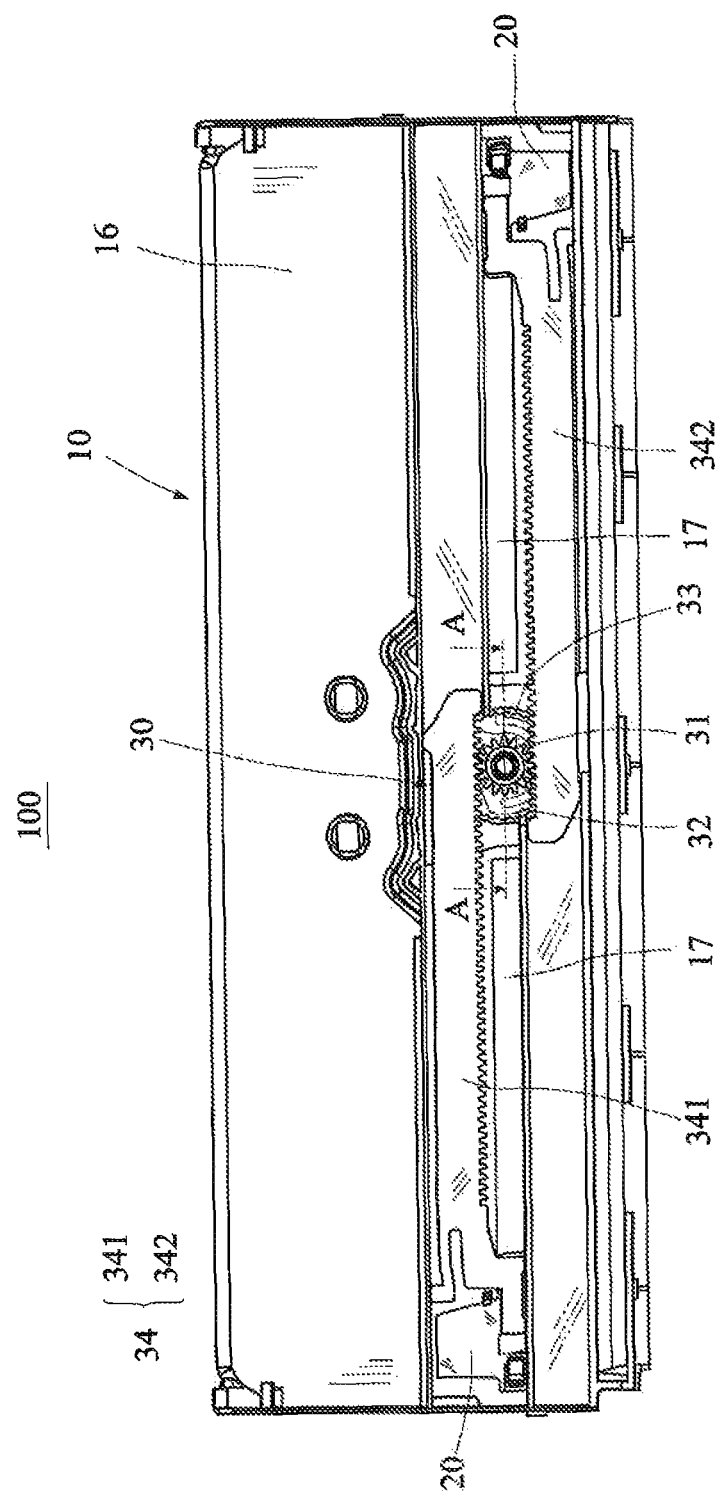
FIG. 3 is a back view of the sheet storage device.
Figure 4:
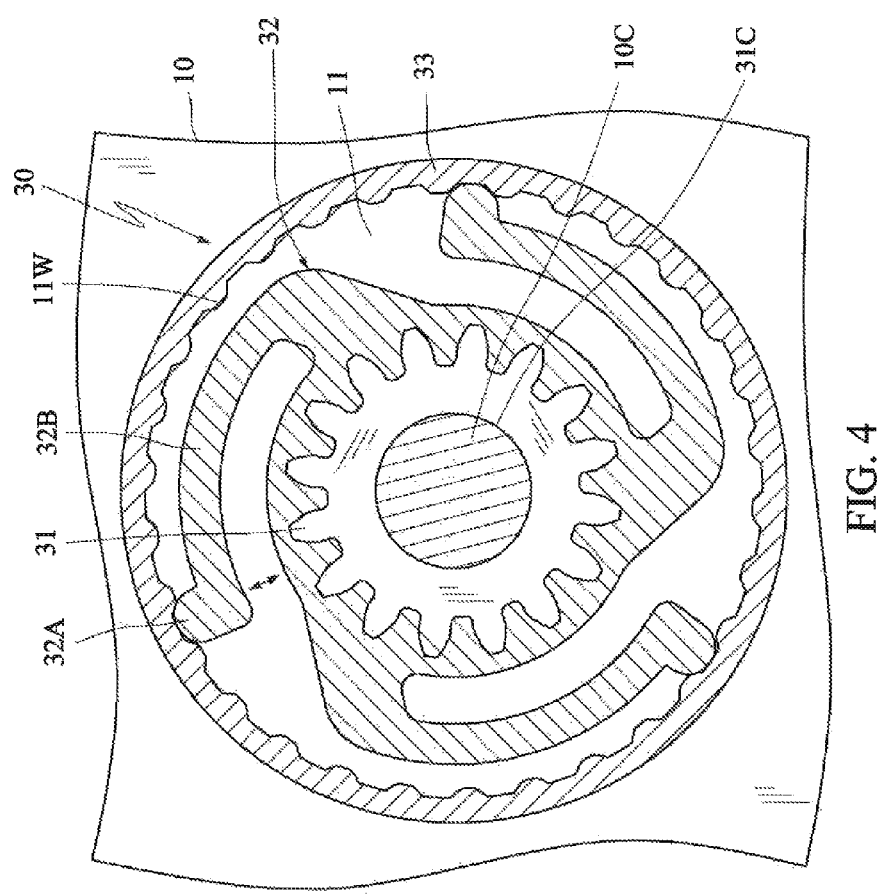
FIG. 4 is an enlarged partial view of the sheet storage device of FIG. 3.

FIG. 2 is a front view of the sheet storage device 100. FIG. 3 is a back view of the sheet storage device 100. FIG. 4 is an enlarged partial view of the sheet storage device 100 of FIG. 3. Referring to FIGS. 2 to 4, the sheet storage device 100 includes a sheet tray 10, two guide plates 20 and a width adjusting mechanism 30.

The sheet tray 10 supports the sheet S or sheets. Symbols, such as A4, A5 and A6 representative of the positions of the edges of the A4, A5 and A6 sheets, may be labeled on the sheet tray 10 to facilitate the user's recognition upon placement of the sheet. The sheet tray 10 is formed with two guiding slots 17.

The two guide plates 20 disposed on the sheet tray 10 guide the static positioning and dynamic transmission of the sheet S placed on the sheet tray 10. For example, when the two guide plates 20 are located at the outermost positions, as shown by the solid line profiles, the two guide plates 20 can guide the sheet S having the larger width; and when the two guide plates 20 are located at the innermost position, as shown by the dashed line profiles, the two guide plates 20 can guide the sheet S' having the smaller width. It is to be noted that the two guide plates 20 may slide on the sheet tray 10 upon the guiding of the guiding slots 17.

The width adjusting mechanism 30, disposed on the sheet tray 10 and connected to the two guide plates 20, adjusts a distance between the two guide plates 20. The width adjusting mechanism 30 includes a pinion 31, a resilient member 32, a toothed portion 33 and two connectors 34.

The pinion 31 is rotatably disposed. The pinion 31 is rotated when one of the guide plates 20 is moved, and moves the other one of the guide plates 20. The rotation of the pinion 31 moves the two guide plates 20 toward or away from each other in reverse directions.

Each of the connectors 34 connects the pinion 31 to one of the guide plates 20. The resilient member 32 is disposed coaxially with the pinion 31 and rotated with the pinion 31. The toothed portion 33 is disposed around the resilient member 32 and in contact with the resilient member 32. The toothed portion 33 provides a resisting force upon rotation of the pinion 31. Because the pinion 31 can be rotated relatively to the sheet tray 10, the toothed portion 33 can be fixed to the sheet tray 10, and may also be integrally formed jointly with the sheet tray 10 by way of injection molding. In this embodiment, two connectors 34 are two racks 341 and 342, which mesh with the pinion 31 and may slide on the sheet tray 10.

The resilient member 32 includes resilient bumps 32A in contact with the toothed portion 33. In addition, the resilient member 32 further includes resilient arms 32B, and the bump 32A is disposed on the resilient arm 32B. Although three bumps 32A and three resilient arms 32B are described in this embodiment, the present invention is not restricted thereto. That is, one single bump 32A/resilient arm 32B or another number of bumps 32A/resilient arms 32B may achieve the effect of the present invention. Alternatively, the resilient bump 32A itself is made of a deformable material, such as rubber, sponge or the like.

As shown in FIG. 4, the pinion 31 and the resilient member 32 are disposed in a cavity 11 of the sheet tray 10, and the toothed portion 33 is formed on a circumferential wall 11W of the cavity 11. A fixed shaft 10C is disposed on the sheet tray 10 and passes through the pinion 31 and a central hole 31C of the resilient member 32 so that the pinion 31 and the resilient member 32 are rotatably disposed. When the pinion 31 and the resilient member 32 rotate, the bump 32A is pushed by the toothed portion 33, and moves resiliently in a radial direction of the resilient member 32 though the resilience of the resilient arm 32B. Thus, the toothed portion 33 is able to provide the resisting force upon rotation of the pinion 31.

As shown in FIG. 2, with the resisting force provided by the toothed portion 33, when the user exerts a force F1 on one of the guide plates 20, the force F1 must be larger than the first resisting force R1, provided by the width adjusting mechanism 30, to enable the width adjusting mechanism 30 to drive the two guide plates 20 to generate a discontinuous movements in the same direction (the two guide plates 20 come toward each other) on the sheet tray 10. Thus, the distance between the two guide plates 20 can be adjusted discontinuously, and the user feels the discontinuous resisting force upon operation, and the discontinuous feeling on the user's hand can be obtained. After the two guide plates 20 touch the sheet S, the sheet S further provides a second resisting force R2 to resist the movements of the two guide plates 20. Because the user needs to increase the exerting force based on the force F1, the larger obstruction to the user is caused. In addition, when the force F1 is fixed, the provision of the first resisting force R1 may also slow down the moving speeds of the two guide plates 20.

Figure 5:
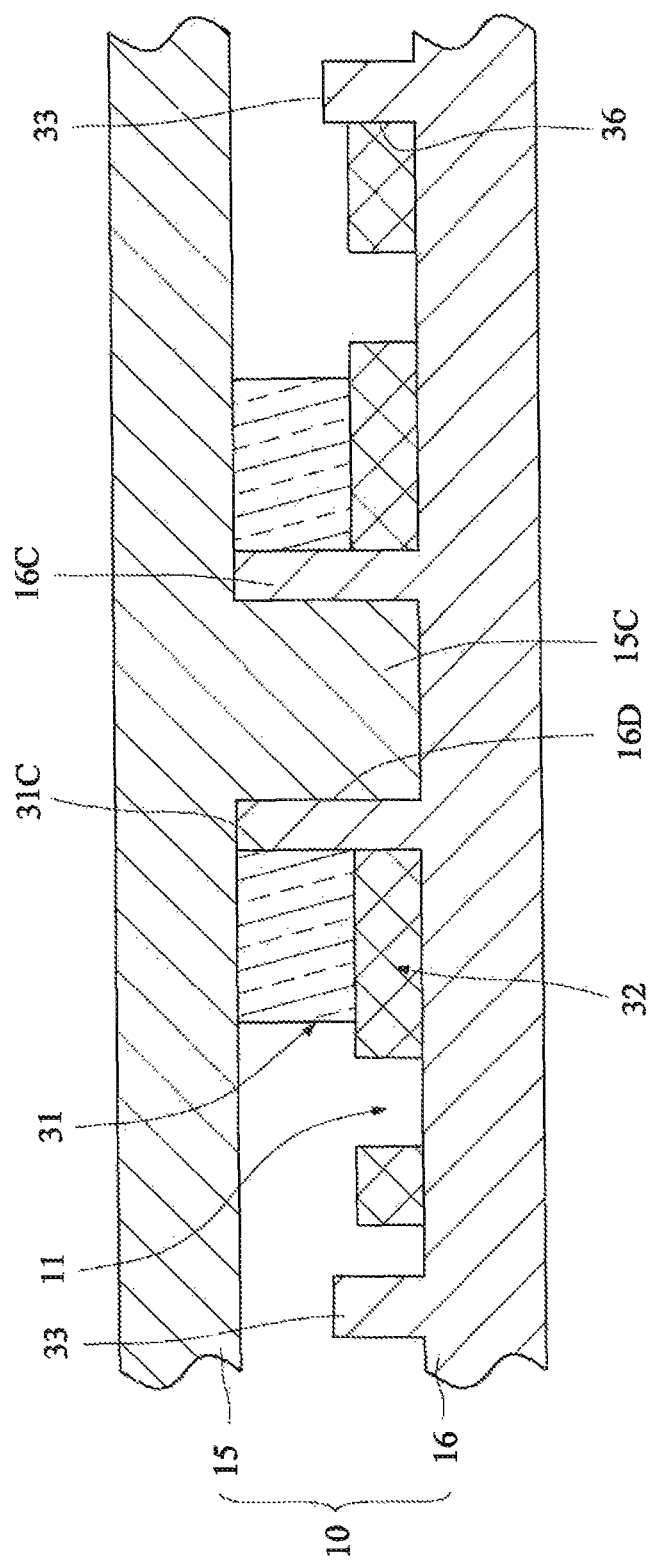
FIG. 5 is a cross-sectional view taken along a line A-A of FIG. 3 and shows an aspect of a pinion and a resilient member.

FIG. 5 is a cross-sectional view taken along a line A-A of FIG. 3 and shows an aspect of the pinion 31 and the resilient member 32. It is to be noted that FIG. 3 only shows a top plate 16 of the sheet tray 10, while the cross-sectional view of FIG. 5 is based on the structure of FIG. 3 plus a base 15. Referring to FIG. 5, the sheet tray 10 includes the base 15 and the top plate 16, wherein the width adjusting mechanism 30 is mounted between the base 15 and the top plate 16. The toothed portion 33 and the top plate 16 are integrally formed jointly with each other in this embodiment, but may also be in the form of two components in another embodiment. The resilient member 32 and the pinion 31 are integrally formed jointly with each other, but may also be in the form of two components in another embodiment. The resilient member 32 and the pinion 31 are fit with a hollow shaft 16C of the top plate 16. Thus, the resilient member 32 is accommodated within the cavity 11, and the bump 32A resiliently pushes against the toothed portion 33. A pin 15C of the base 15 is inserted into an opening 16D of the hollow shaft 16C such that the base 15 and the top plate 16 are connected and fixed to each other. The pinion 31 is fit with the hollow shaft 16C of the top plate 16 through its central hole 31C, so that the pinion 31 and the resilient member 32 are rotatably disposed between the base 15 and the top plate 16 without the use of other screw members.

Figure 6:
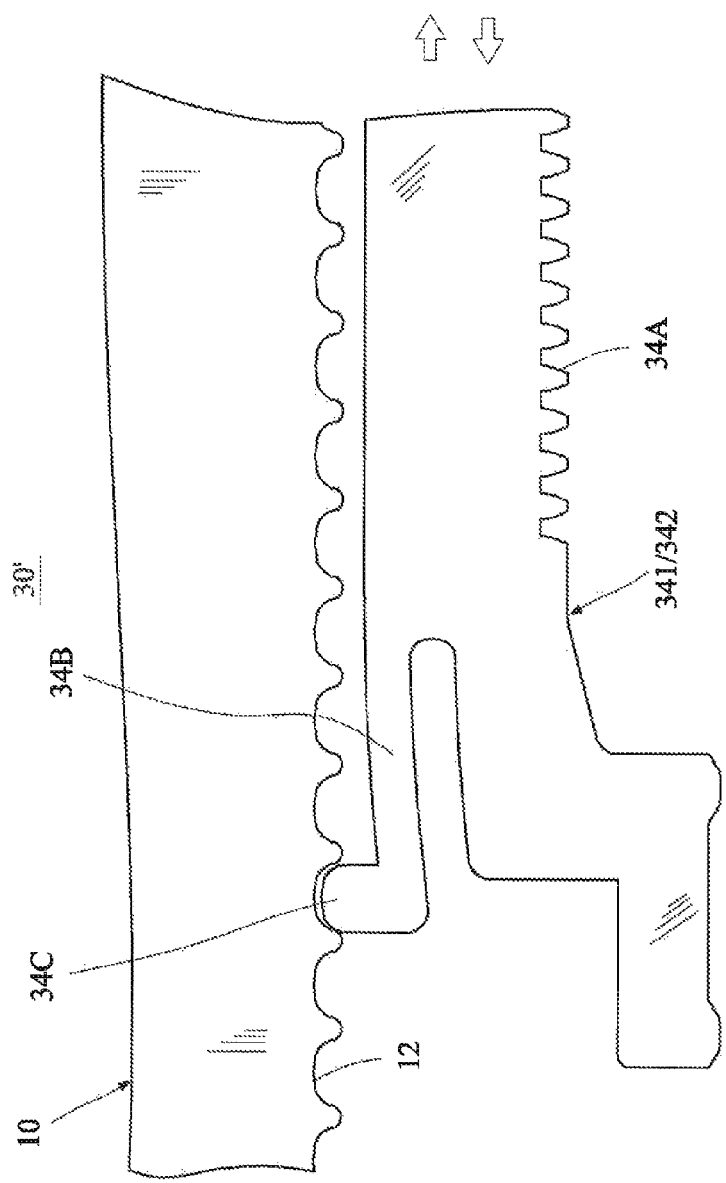
FIG. 6 is a partial schematic view of a width adjusting mechanism of a sheet processing apparatus according to a second embodiment of the present invention.

FIG. 6 is a partial schematic view of a width adjusting mechanism 30' of a sheet processing apparatus according to a second embodiment of the present invention. As shown in FIG. 6, this embodiment is similar to the first embodiment except that a lateral side of each rack 341/342 is formed with a toothed structure 34A meshing with the pinion 31 (see FIG. 4). In addition, the other lateral side of at least one of the racks 341 and 342 is formed with a resilient arm portion 34B resiliently pushing against a toothed portion 12 disposed on the sheet tray 10. Similar to the first embodiment, the resilient arm portion 34B also has a bump 34C pushing against the toothed portion 12. The width adjusting mechanism 30' of this embodiment provides a function similar to that of the first embodiment, and thus may be present independently from or together with the width adjusting mechanism 30 of the first embodiment. When the width adjusting mechanisms 30 and 30' are present concurrently, the pause points of the width adjusting mechanisms 30 and 30' may be properly arranged alternately to shorten the minimum movement distance of the width adjusting mechanism, thereby increasing the resolution of adjustment. For example, the adjustment of each of the width adjusting mechanisms 30 and 30' is divided into 16 stages, and the adjustment of the width adjusting mechanisms 30 and 30' is further divided into 32 stages by alternately arranging the width adjusting mechanisms 30 and 30'.

Figure 7:
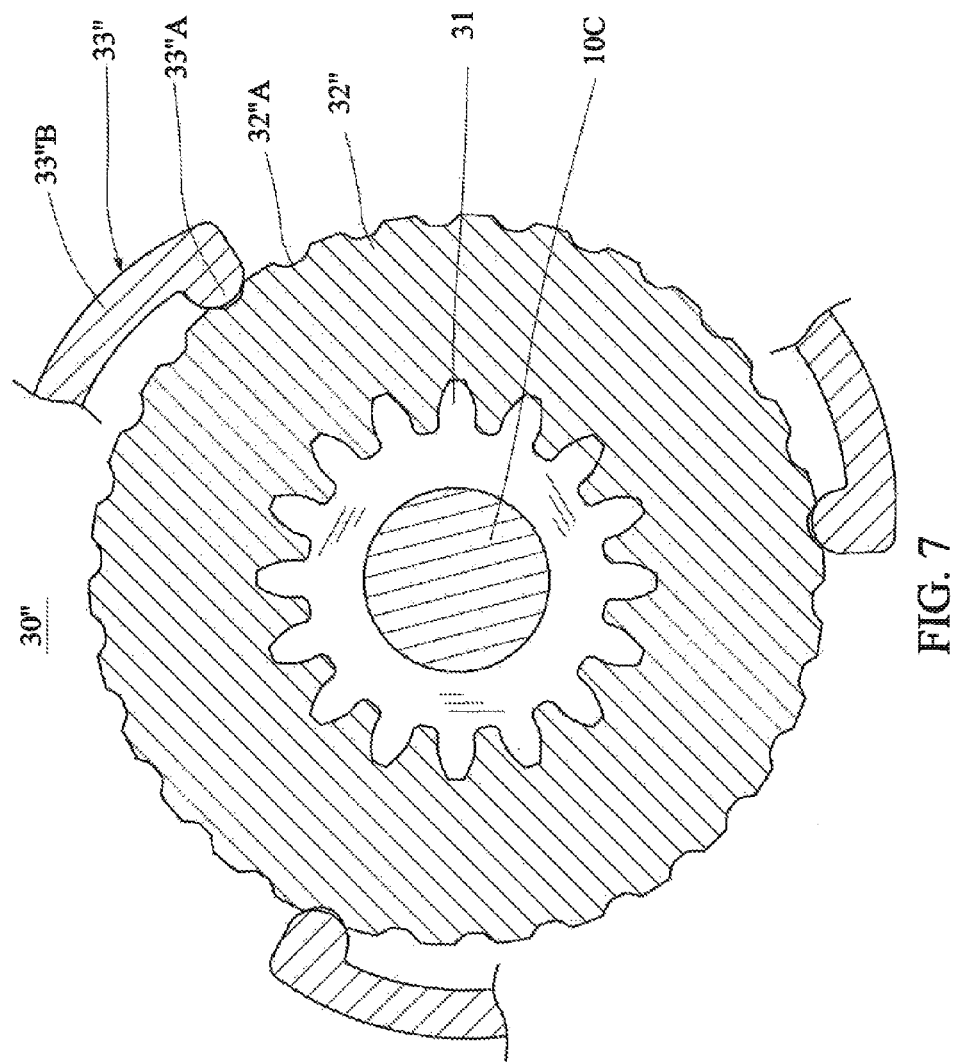
FIG. 7 is a partial schematic view of a width adjusting mechanism of a sheet processing apparatus according to a third embodiment of the present invention.

FIG. 7 is a partial schematic view of a width adjusting mechanism 30" of a sheet processing apparatus according to a third embodiment of the present invention. As shown in FIG. 7, this embodiment is similar to the first embodiment except that this embodiment has the structure of the external toothed portion modified from the internal toothed portion of the first embodiment. The other similar structures, which may be found in FIGS. 2 and 3, are not depicted here. Referring to FIGS. 2, 3 and 7, the width adjusting mechanism 30" of this embodiment is also disposed on the sheet tray 10 and connected to the two guide plates 20, and is for adjusting the distance between the two guide plates 20. The width adjusting mechanism 30" includes a pinion 31, a toothed member 32", a resilient flange 33" and two connectors 34. The toothed member 32" is disposed coaxially with and rotated with the pinion 31. The resilient flange 33" is disposed around the toothed member 32" and in contact with the toothed member 32". The resilient flange 33" provides a resisting force upon rotation of the pinion 31 about the fixed shaft 10C. In this embodiment, three resilient flanges 33" and the fixed shaft 10C are disposed on the sheet tray 10. Similar to the first embodiment, the resilient flange 33" includes a resilient bump 33"A in contact with a toothed structure 32"A of the toothed member 32". In addition, the resilient flange 33" further includes a resilient arm 33"B, on which the bump 33"A is disposed. The width adjusting mechanism of this embodiment may also provide the function, which is the same as that of the first embodiment.

The sheet storage device of the present invention utilizes the toothed portion and the resilient member pushing against each other to provide the resisting force for the two guide plates. The resisting force provides the discontinuous and reliable feeling to the user, thereby enhancing the width adjustment accuracy and efficiency, and reducing the trouble that may be encountered when the user is adjusting the distance between the guide plates. This provides another different operation feeling for the user.

While the present invention has been described by way of examples and in terms of preferred embodiments, it is to be understood that the present invention is not limited thereto. To the contrary, it is intended to cover various modifications. Therefore, the scope of the appended claims should be accorded the broadest interpretation so as to encompass all such modifications.

What is claimed is:

1. A sheet storage device, comprising:
   a sheet tray supporting a sheet;
   two guide plates, disposed on the sheet tray, for guiding transportation of the sheet placed on the sheet tray; and
   a width adjusting mechanism, disposed on the sheet tray and connected to the two guide plates, for adjusting a distance between the two guide plates, wherein the width adjusting mechanism comprises:
   a pinion rotatably disposed;
   a resilient member disposed coaxially with and rotated with the pinion;
   a toothed portion, disposed around the resilient member and in contact with the resilient member, the toothed portion providing a resisting force upon rotation of the pinion; and
   two connectors, each connecting the pinion to one of the two guide plates.

2. The sheet storage device according to claim 1, wherein the resilient member comprises a resilient bump in contact with the toothed portion.

3. The sheet storage device according to claim 2, wherein the resilient member further comprises a resilient arm, on which the bump is disposed.

4. The sheet storage device according to claim 1, wherein the resilient member comprises a plurality of resilient bumps in contact with the toothed portion.

5. The sheet storage device according to claim 1, wherein the pinion and the resilient member are disposed in a cavity of the sheet tray, and the toothed portion is formed on a circumferential wall of the cavity.

6. The sheet storage device according to claim 1, wherein the two connectors are two racks, which mesh with the pinion and may slide on the sheet tray.

7. The sheet storage device according to claim 6, wherein a lateral side of each of the two racks is formed with a toothed structure meshing with the pinion, and the other lateral side of at least one of the racks is formed with a resilient arm portion resiliently pushing against a toothed portion disposed on the sheet tray.

8. The sheet storage device according to claim 1, wherein the sheet tray comprises a top plate and a base, and the width adjusting mechanism is mounted between the top plate and the base.

9. A sheet processing apparatus, comprising:
   the sheet storage device according to claim 1; and
   a sheet-feeding mechanism and a sheet processing unit, wherein the sheet-feeding mechanism transports the sheet past the sheet processing unit, and the sheet processing unit processes the sheet.

10. A sheet storage device, comprising:
    a sheet tray for supporting a sheet;
    two guide plates, disposed on the sheet tray, for guiding transportation of the sheet placed on the sheet tray; and
    a width adjusting mechanism, disposed on the sheet tray and connected to the two guide plates, for adjusting a distance between the two guide plates, the width adjusting mechanism comprising:
    a pinion rotatably disposed;
    a toothed member disposed coaxially with and rotated with the pinion;
    a resilient flange, which is disposed around and in contact with the toothed member, and provides a resisting force upon rotation of the pinion; and
    two connectors, each connecting the pinion to one of the two guide plates.

11. The sheet storage device according to claim 10, wherein the resilient flange comprises a resilient bump in contact with a toothed structure of the toothed member.

12. The sheet storage device according to claim 11, wherein the resilient flange further comprises a resilient arm, on which the resilient bump is disposed.

13. A sheet processing apparatus, comprising:
the sheet storage device according to claim 10; and
a sheet-feeding mechanism and a sheet processing unit, wherein the sheet-feeding mechanism transports the sheet past the sheet processing unit, and the sheet processing unit processes the sheet.

\* \* \* \* \*